United States Patent [19]

Jenkins

[11] Patent Number: 5,138,691
[45] Date of Patent: Aug. 11, 1992

[54] GAS SEAL

[75] Inventor: Peter D. Jenkins, Woodbridge, England

[73] Assignee: British Telecommunications public limited company, Great Britain

[21] Appl. No.: 681,538
[22] PCT Filed: Oct. 4, 1989
[86] PCT No.: PCT/GB89/01176
  § 371 Date: May 7, 1991
  § 102(e) Date: May 7, 1991
[87] PCT Pub. No.: WO90/04192
  PCT Pub. Date: Apr. 19, 1990

[30] Foreign Application Priority Data

Oct. 5, 1988 [GB] United Kingdom ............... 8823427

[51] Int. Cl.⁵ .................................................. G02B 6/36
[52] U.S. Cl. .................................................. 385/138
[58] Field of Search .................. 137/494; 174/705; 385/134, 138

[56] References Cited

U.S. PATENT DOCUMENTS 4,756,595 7/1988 Braun et al. ...................... 385/138
4,997,256 3/1991 Sano et al. ......................... 385/102

FOREIGN PATENT DOCUMENTS 0108590 5/1984 European Pat. Off. .
0204065 12/1986 European Pat. Off. .
1201139 9/1965 Fed. Rep. of Germany .
2136499 12/1972 France .
2122367 1/1984 United Kingdom .

Primary Examiner—Frank Gonzalez
Assistant Examiner—Jun Ngo
Attorney, Agent, or Firm—Nixon & Vanderhye

[57] ABSTRACT

A seal for a duct (7) containing a transmission line package (P) comprises a flexible member (2) disposed in a connector (1). The flexible member (2) has a waisted portion that collapses inwardly onto the transmission line package (P) to form a gas seal up to pressures of about 2 bar, above which the waisted portion yields to permit removal or insertion of the transmission line package, for example by the fibre blowing technique. Vents (8) are provided in the connector (1) so that an increase in ambient pressure externally of the connector increases the resistance of the waisted portion to opening. The arrangement may be used to maintain water tightness or pressure differentials over a bulkhead.

7 Claims, 2 Drawing Sheets

GAS SEAL

This invention relates to a sealing arrangement for a duct, and in particular to a seal for incorporation in a duct along which an optical fibre package is installed by fibre blowing.

A duct along which a transmission line (e.g. optical fibre) package is installed provides a continuous path along which fluid can travel. Unless such a duct is provided with seals to inhibit fluid flow, hazards can arise. For example, gas leaks may result in the introduction of toxic or explosive gases at secondary locations, or water may leak across otherwise watertight bulkheads. Therefore, to comply with safety requirements, after a blown optical fibre installation is completed, seals or blockages are provided at intervals by perforating the duct and injecting a resin. The disadvantage of this technique is that the resin forms a permanent blockage in the duct, and prevents further installation of fibre packages, or the replacement of an installed package without first removing the resined section of the duct. Removal of the resined section is time-consuming, and requires cutting of the optical fibre package, requiring subsequent replacement of a complete duct section, or the introduction of additional splices.

The aim of the invention is to provide a seal that does not prevent subsequent installation operations.

The present invention provides a sealing arrangement for a passageway carrying a transmission line package, the arrangement comprising a coupling portion for connection to respective passageway portions on each side thereof, a flexible seal located in the coupling portion and comprising a flexible body portion, the flexible body portion being arranged to collapse inwardly to seal around a transmission line package when the transmission line package is installed through the coupling portion, and the flexible body portion being arranged to open to permit fluid flow through the coupling poriton when the fluid flow pressure exceeds a predetermined level, wherein the coupling portion is provided with at least one vent disposed so that pressure externally of the coupling portion tends to cause inward deformation of the body portion of the seal to increase its resistance to opening.

Advantageously, the flexible seal comprises a tubular member having a waisted intermediate portion that forms the seal, and wherein the ends of the tubular member are secured to the inner wall of the coupling portion with the or each vent disposed between the locations at which the ends of the tubular member are secured. The flexible seal may have substantially flat opposing surfaces.

The invention will now be described in greater detail, by way of example, with reference to the accompanying drawings, in which.

The type of system with which the invention is concerned, and the context in which it is described, is in blown fibre installations. Fibre blowing is the process described in our European patent specification 108590, in which lightweight transmission lines are urged along ducts by the viscous drag of a fluid, usually compressed air. The propellant air is typically at an initial pressure of 3 to 10 bar. The transmission lines typically comprises a bundle of optical fibres encased in a lightweight outer covering, and this is termed a fibre package. Fibre packages may also consist of single fibres or lines, and may include electrical conductors.

Figure 1:
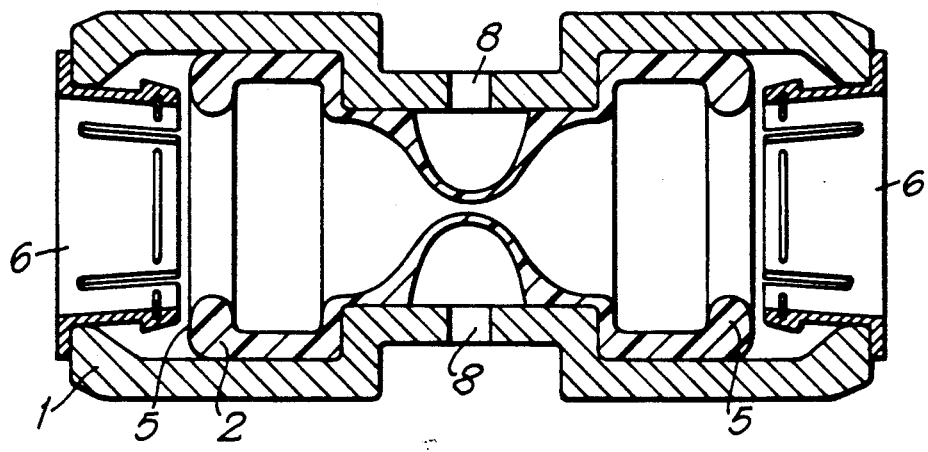
FIG. 1 is a schematic section through a tube connector provided with a gas blocking seal according to a preferred embodiment of the invention.

Referring to the drawings, FIG. 1 shows a tube connector 1 provided with a flexible tubular liner 2 which constitutes a seal. A respective locking ring 6 is provided at each end of the connector 1, the locking rings each receiving and clamping a respective duct section 7 (see FIGS. 2 to 4) along which a fibre package P is subsequently blown. The duct sections 7 form part of a duct along which fibre package P is to be installed. The ends of the duct extend into the ends of the seal 2, whereby compression of rims 5 on the ends of the connector 1 serves to seal the outer wall of duct sections 7 against the inner wall of the connector, thereby preventing escape of the installing propellant, or ingress of pressure from the external environment.

The central portion of the connector 1 is provided with apertures 8 through which the external ambient pressure is communicated to the outer side of the seal 2. The seal 2 itself is moulded to have a waisted shape, the longitudinal section comprising a series of steps and curves. Alternatively, the seal 2 may have a smooth curve or taper from its ends to the centre. The passageway through the centre of the seal 2 is in the nature of a flattened tube, such that it acts as a blockage in the connector 1 and prevents flow of fluid below a particular pressure e.g. below 2 bar. The tube defined by the seal 2 has a minimum internal diameter which is less than the diameter of the fibre package P, so that, once the fibre package is installed, the central part of the seal presses around the circumference of the fibre package to form a gas-tight seal.

The resilience and/or flexibility of the seal 2 is controlled so that the seal remains in sealing engagement around the installed fibre package P (see FIG. 2) when the external pressure is normal atmospheric pressure, and the pressure within the duct is less than 2 bar (this value may be varied for different applications). If the external pressure increases, for example due to flooding on one side of a bulkhead, the seal 2 is pushed more firmly against the fibre package P, and increases the resistance of the seal to opening, so that, if there was a fracture in the duct section 7 on the high pressure (flooded) side of the seal, the duct would not provide a breach of the bulkhead because the same additional pressure maintains the seal in the closed configuration.

Figure 3:
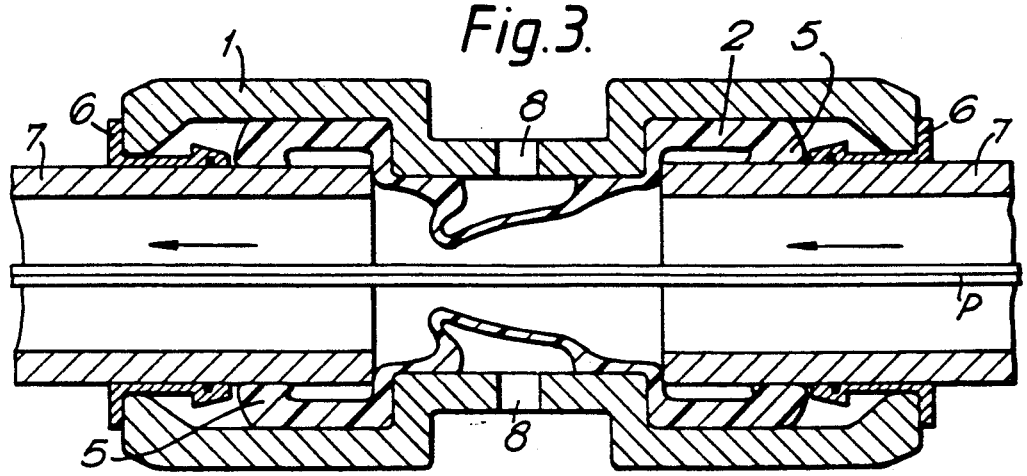
FIG. 3 shows the embodiment of FIG. 1 during installation of the fibre package.
Figure 4:
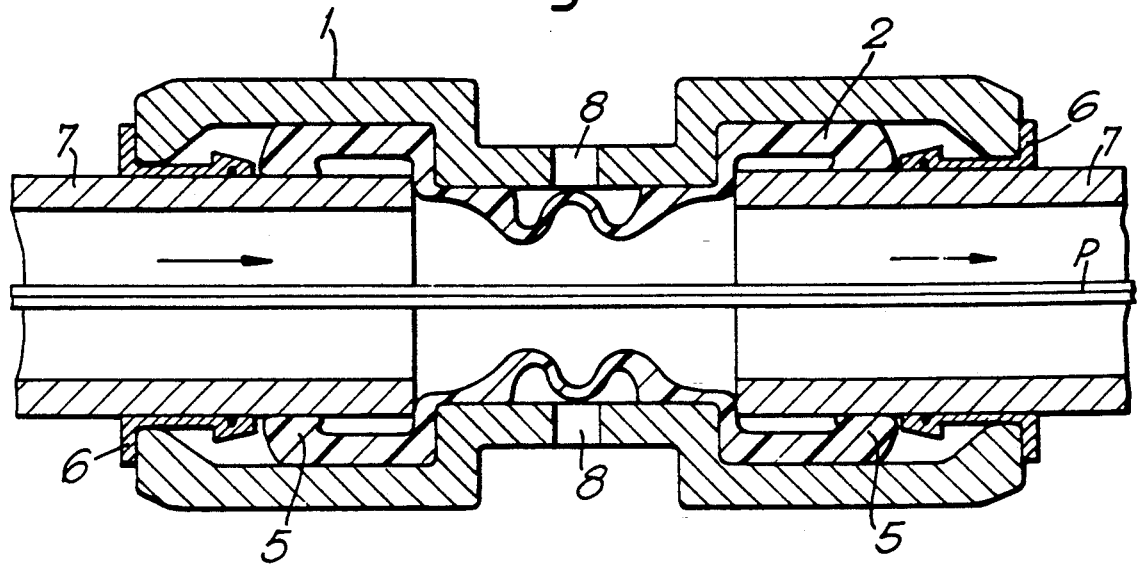
FIG. 4 shows a modified embodiment during fibre package installation.

FIG. 3 shows how the seal 2 may deform in order to permit installation. Air, or some other propellant, is introduced into the duct at a pressure in excess of that required to deform the seal. Consequently, the seal expands rather like a balloon or inner tube, and the propellant and the fibre package P (which is urged along by the propellant) pass through the opened seal 2, which closes around the package once the introduction of pressurised propellant is discontinued. The seal 2 (see FIG. 3) deforms by flexure of the central waisted portion in the direction of flow. In an alternative embodiment (see FIG. 4), the central waisted portion of the seal 2 flexes radially outwardly. The geometry of the deformation may be aided or controlled by the provision of selective areas or lines of weakness or stiffening (not shown), along which flexure or resistance to flexure will preferentially occur.

Figure 5:
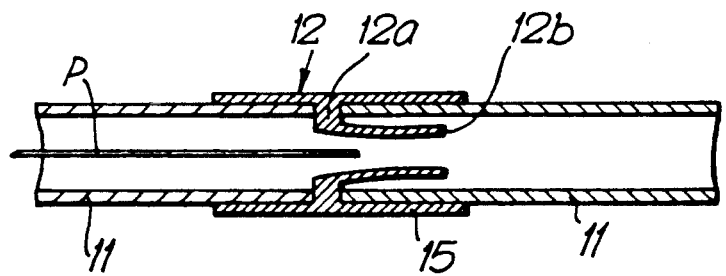
FIG. 5 is a schematic section through a duct showing an alternative embodiment of seal according to the invention in an open condition.
Figure 6:
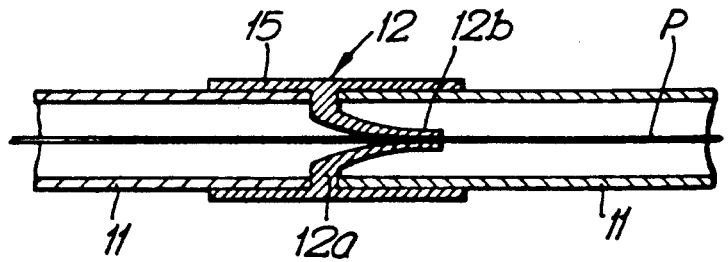
FIG. 6 is a schematic section through a duct showing the seal of FIG. 5 in a sealing condition.

FIGS. 5 and 6 shown an alternative embodiment, in which a duct 11 is provided with an insert seal 12 which comprises an annular flange portion 12a and a body portion 12b. The flange portion 12a engages between two connecting sections of the duct 11, and is formed as part of the connector 15 that holds the duct section together. The connector 15 is not shown in detail in FIGS. 5 and 6, but is similar to the connector 1 of FIGS. 1 to 4. Alternatively, the flange portion 12b of the seal 12 is adapted to be held by the connector 15. The body portion 12b is made of a relatively-soft, flexible material such as a synthetic rubber, and may have a variety of configurations. For example, it may be tubular with a bore diameter substantially equal to, or less than, the minimum diameter of the transmission line package P that is to be installed along the duct 11.

The bore of the tubular body portion 12b may be conical or tapering, with the wider end connected to the flange portion 12a. Alternatively, the tubular body portion 12b may comprise a flat body portion consisting essentially of upper and lower lip portions that press against each other in the undisturbed state.

When at rest, either before or after installation of the transmission line package P along the duct 11 the body portion 12b is collapsed inwardly as shown in FIG. 6. When the transmission line package P is present the tubular body portion 12b forms a seal around the package P which is sufficiently close-fitting to prevent substantive egress (or low pressure flow) of gas along the duct 11. The elasticity of the seal 12 is such that, from one direction, a relatively high pressure flow of gas, such as 100 psi, will expand the seal sufficiently to enable passage of the package P (see FIG. 5). Preferably, the seal 12 expands to lie substantially flat against the sides of the duct 11, thereby presenting a minimum impedance to the passage of the package P during a blowing installation. Once the package P is installed, and the injection of compressed gas into the duct 11 has ceased, the body portion 12b of the seal 12 collapses back onto the fibre package.

The seal 12 described above with reference to FIGS. 5 and 6 is unidirectional, in that it permits fibre blowing installation in one direction, but would remain resistant to opening in the opposite direction. It is envisaged that, by providing a sufficiently-thin seal, rather like a diaphragm with a central, short-lipped aperture, a seal that will open bidirectionally can be provided, with the lips inverting through the aperture to permit either direction of high pressure flow.

Unidirectionally-opening seals may be made to have high resistance in one direction, so that blown installation can take place only from one direction, thus preventing unauthorised installation from the other direction. This may be particularly useful for maintaining integrity within a building, with it being possible to blow packages outwardly from the building, but preventing access or even high pressure fluid flow along the ducts from outside the building.

Figure 2:
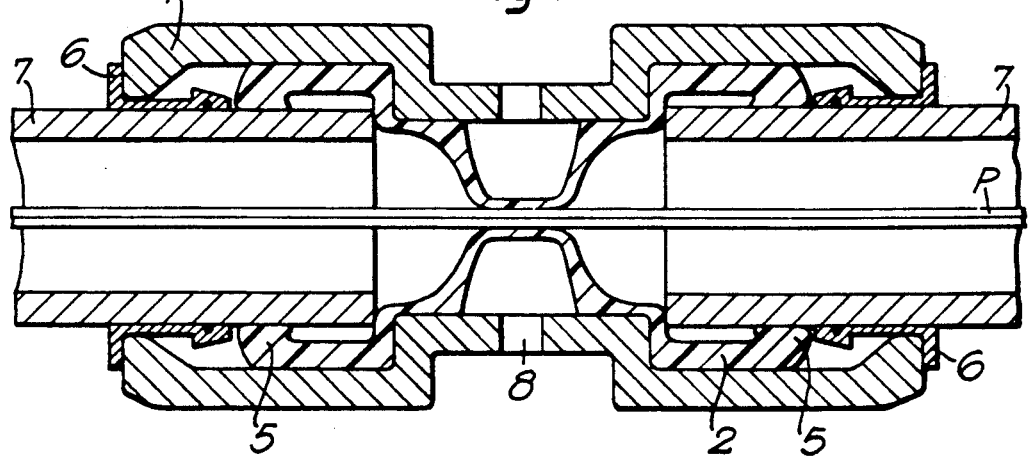
FIG. 2 shows the embodiment of FIG. 1 with a fibre package installed.

Seals of the type described may be provided at intervals along a route to prevent low pressure leakage of contaminants along the duct. Another application is to provide such a seal in a lead-through gland between two airtight chambers, for example in the watertight bulkhead of a sea-going vessel. In this latter application, a seal connection, such as that shown in FIG. 2, is preferably provided each side of a bulkhead, so that a leak on either side causes additional sealing by water pressure as previously described.

I claim:

1. A sealing arrangement for a passageway carrying a transmission line package, the arrangement comprising a coupling portion for connection to respective passageway portions on each side thereof, a flexible seal located in the coupling portion and comprising a flexible body portion, the flexible body portion being arranged to collapse inwardly to seal around a transmission line package when the transmission line package is installed through the coupling portion, and the flexible body portion being arranged to open to permit fluid flow through the coupling portion when the fluid flow pressure exceeds a predetermined level, wherein the coupling portion is provided with at least one vent disposed so that pressure externally of the coupling portion tends to cause inward deformation of the body portion of the seal to increase its resistance to opening.

2. A sealing arrangement as claimed in claim 1, wherein the flexible seal comprises a tubular member having a waisted intermediate portion that forms the seal, and wherein the ends of the tubular member are secured to the inner wall of the coupling portion with the or each vent disposed between the locations at which the ends of the tubular member are secured.

3. A sealing arrangement as claimed in claim 1, wherein the flexible seal has substantially flat opposing surfaces.

4. A sealing arrangement as claimed in claim 1, wherein the seal opens unidirectionally.

5. A blown-fibre installation comprising at least one blown-fibre duct which extends outside a building from within the building, a gas seal being provided in a segment of said duct to prevent the flow of gas into the building via said duct, characterised in that said gas seal is flexible and comprises a flexible body portion, the flexible body portion being arranged to collapse inwardly around a transmission line package when the transmission line has been installed through said duct segment, the flexible body portion being arranged to open to permit fluid flow through said duct segment when the fluid flow pressure exceeds a predetermined level, and wherein the flexible body portion extends along said duct segment and is arranged to form an elongate seal with the surface of an installed transmission line package.

6. A blown-fibre installation as claimed in claim 5, wherein a transmission line package extends through said seal.

7. An installation as claimed in claim 6 wherein said flexible body portion sealingly conforms to the surface of said transmission line package.

* * * * *